United States Patent
Kajiwara

(10) Patent No.: US 8,071,245 B2
(45) Date of Patent: Dec. 6, 2011

(54) HYBRID FUEL CELL SYSTEM

(75) Inventor: Shigeto Kajiwara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1137 days.

(21) Appl. No.: 10/581,859

(22) PCT Filed: Dec. 2, 2004

(86) PCT No.: PCT/IB2004/003946
§ 371 (c)(1),
(2), (4) Date: Jun. 5, 2006

(87) PCT Pub. No.: WO2005/057702
PCT Pub. Date: Jun. 23, 2005

(65) Prior Publication Data
US 2007/0111057 A1     May 17, 2007

(30) Foreign Application Priority Data
Dec. 5, 2003  (JP) ................. 2003-407160

(51) Int. Cl.
*H01M 8/04* (2006.01)
*B60K 1/00* (2006.01)

(52) U.S. Cl. ........ 429/430; 429/428; 429/431; 429/432; 180/65.31

(58) Field of Classification Search .............. 429/12–46; 320/101; 180/65.31
See application file for complete search history.

(56) References Cited

U.S. PATENT DOCUMENTS

| | | | |
|---|---|---|---|
| 5,714,874 A | 2/1998 | Bonnefoy | |
| 5,929,594 A * | 7/1999 | Nonobe et al. | 320/104 |
| 6,214,484 B1 | 4/2001 | Hauer | |
| 6,621,250 B1 | 9/2003 | Ohkubo et al. | |
| 2002/0175657 A1 | 11/2002 | Leboe | |
| 2003/0094816 A1 | 5/2003 | Kazama | |
| 2003/0177846 A1* | 9/2003 | Tamagawa et al. | 73/862.29 |
| 2004/0083039 A1* | 4/2004 | Hunt et al. | 701/22 |

FOREIGN PATENT DOCUMENTS

| | | |
|---|---|---|
| CN | 1460077 A | 12/2003 |
| DE | 197 31 250 A1 | 1/1998 |
| DE | 102 02 875 A1 | 8/2002 |
| DE | 101 25 106 A1 | 12/2002 |
| DE | 102 18 672 A1 | 11/2003 |
| DE | 102 33 821 A1 | 2/2004 |
| EP | 1 220 413 A1 | 7/2002 |
| JP | A 63-45765 | 2/1988 |
| JP | A 2-309563 | 12/1990 |
| JP | A 2002-300703 | 10/2002 |
| WO | WO 03/052860 A2 | 6/2003 |

\* cited by examiner

*Primary Examiner* — Basia Ridley
*Assistant Examiner* — Sean P Cullen
(74) *Attorney, Agent, or Firm* — Oliff & Berridge, PLC

(57) ABSTRACT

According to the invention, a hybrid fuel cell system (100) is characterized by comprising a load portion (3) which consumes electric power; first control means (11) for obtaining a supply electric power set value (P bat ref) indicating electric power supplied from the electric power storage device (40), based on a supply electric power set value (P fc ref) indicating electric power supplied from the fuel cell (20) and a consumption electric power set value (P mot ref) indicating electric power consumed by the load portion (3); difference obtaining means (41) for obtaining a difference between the supply electric power set value (P bat ref) and an actual supply electric power value (P bat mos) indicating electric power actually supplied from the electric power storage device (40); and second control means (12) for controlling the amount of electric power consumed by the load portion (3) based on the difference.

17 Claims, 1 Drawing Sheet

HYBRID FUEL CELL SYSTEM

BACKGROUND OF THE INVENTION

1. Field of the Invention

The invention relates to a hybrid fuel cell system. More particularly, the invention relates to an improvement of an electric power control method in a hybrid fuel cell system including an electric power storage device.

2. Description of the Related Art

In a conventional hybrid fuel cell system, in order to prevent over discharge/overcharge of a battery that is an electric power storage device, a remaining electric capacity of the battery is detected, and an amount of electric power generated by a fuel cell is adjusted, whereby a balance between charge and discharge in the battery is maintained.

An example of such a technology is a fuel cell power supply unit disclosed in Japanese Patent Laid-Open Publication No. 63-45765. In this fuel cell power supply unit, an amount of electric power remaining in a secondary battery and an electric current output from a fuel cell are detected, and the electric current output from the fuel cell is controlled in a feedback manner based on a set signal corresponding to the amount of electric power remaining in the secondary battery and a measurement signal corresponding to the electric current output from the fuel cell.

However, in the above-mentioned technology, the output electric current and a state of charge detected by sensors attached to the fuel cell and the secondary battery are used as the base information for control without being processed. Therefore, due to insufficient accuracy of the sensor and variation in the detected values obtained by the sensors, the information obtained by the sensors may differ from the actual information. If electric power control is performed based on the information having an error, an imbalance may be created between charge and discharge in the entire fuel cell system. Such an imbalance causes over discharge/overcharge of the secondary battery, and makes it difficult to maintain the optimum efficiency of the electric power generation in the entire system.

SUMMARY OF THE INVENTION

It is therefore an object of the invention to provide a hybrid fuel cell system in which a balance between charge and discharge in the system can be accurately maintained without being affected by accuracy of actual measurement.

The hybrid fuel cell system includes a fuel cell and an electric power storage device. The hybrid fuel cell system further includes a load portion which consumes electric power; and a control portion which controls an amount of electric power consumed by the load portion based on a difference between a supply electric power set value indicating an amount of electric power which needs to be supplied from the electric power storage device and an actual supply electric power value indicating an amount of electric power which is actually supplied from the electric power storage device.

With the above-mentioned structure, when an amount of electric power which the fuel cell is requested to generate and an amount of electric power which the load portion is requested to consume are decided, an amount of electric power which needs to be compensated by the electric power storage device, that is, a supply electric power set value is obtained. However, the intended amount of electric power may not be generated or consumed since there is an error or variation in the measurement in the system in actuality. Further, even when the amount of electric power which is generated or consumed is actually measured, the measurement value may contain an error due to variation in measurement performed by the sensor. In this case, the error may be increased by accumulating the measurement values obtained by two or more sensors. Namely, due to a cumulative error and the like caused by various portions of the system, the supply electric power set value may deviate from the actual supply electric power value indicating the amount of electric power which is actually output from the electric power storage device. With this structure, the amount of electric power consumed by the load portion is adjusted based on the difference between the supply electric power set value and the actual supply electric power value of the electric power storage device, that is, the balance between charge and discharge in the system based on a detection error and the like caused in a feedback system in each portion of the system. Accordingly, an error in actual measurement can be kept to a minimum, compared with the case where the amounts of electric power generated and consumed by the various portions of the system are respectively measured, and then added up.

The type of the "electric power storage device" is not particularly limited. The invention can be applied to any electric power supply means in which over discharge and overcharge should not be caused. As an electric power storage device, for example, a lead battery, a NiCd battery, a nickel hydride battery, a lithium ion secondary battery or a capacitor can be used.

The "load portion" is an electric power consumption source which can control the amount of electric power to be consumed. The load portion is means capable of performing powering and regeneration of electric power. In an in-vehicle fuel cell system, a three phase alternating current motor for driving or a system accessory (e.g. a pump) may be used.

The "actual supply electric power value" is a value indicating the amount of electric power which is actually supplied from the electric power storage device. The actual supply electric power value includes not only a value indicating the amount of electric power directly obtained by the sensor or the like but also an actual supply electric power corresponding value which is indirectly obtained by another physical quantity or obtained by computation.

In this case, the control portion may obtain the supply electric power set value indicating the amount of electric power which needs to be supplied from the electric power storage device based on a supply electric power set value indicating an amount of electric power which needs to be supplied from the fuel cell and a consumption electric power set value indicating an amount of electric power which needs to be consumed by the load portion. With this structure, the supply electric power set value indicates the amount of electric power which needs to be generated by the fuel cell, and the consumption electric power set value indicates the amount of electric power which needs to be consumed by the load portion. Accordingly, the difference between the electric power supply and the electric power consumption is the amount of electric power that needs to be compensated by the electric power storage device, that is, the supply electric power set value of the electric power storage device.

For example, the load portion may include a system accessory. Also, the control portion may obtain the supply electric power set value indicating the amount of electric power which needs to be supplied from the electric power storage device, using the consumption electric power set value including the amount of electric power consumed by the system accessory. With the above-mentioned structure, the amount of electric power consumed by the system accessory, which consumes a certain amount of electric power, is reflected on the computation of the balance between charge and discharge in the system. Accordingly, the amount of electric power consumed by the load portion can be further accurately controlled.

In this case, the "system accessory" is a generic term for electric power consuming devices other than a main electric power consumption source. Examples of the system accessory are a pump, a compressor, valves, and devices which consume electric power.

In this case, as the amount of electric power consumed by the system accessory, the consumption electric power set value is preferably used, if the electric power consumption can be set and controlled. However, if the system accessory includes two or more devices, the operation state of the system accessory is not constant, and the electric power consumption cannot be estimated, the electric power consumption may be set based on the total of the measurement values actually obtained by the devices, or the total of the measurement values actually obtained by at least the devices which consume relatively large amount of electric power. The total amount of electric power consumed by the system accessory is relatively small, and the effect on the entire electric power consumption is small even if there is an error due to accuracy of the sensor and variation in the detected values obtained by the sensors. Therefore, it can be considered that an error is small even when the actual measurement values are used.

For example, the load portion may include a drive motor, and the control portion may control the amount of electric power consumed by the drive motor based on the difference. With the above-mentioned structure, it is possible to control driving of the drive motor which consumes relatively large amount of electric power, based on the difference between the supply electric power set value and the actual supply electric power value. Accordingly, the imbalance between charge and discharge in the system can be removed by the drive motor.

In this case, the "drive motor" is a three phase synchronous motor which can perform powering and regeneration. Particularly, the "drive motor" is preferably a motor which need not operate at all times. This type of motor can be instantaneously operated for removing the imbalance between charge and discharge in the system without taking effects on the other devices into consideration. Even when a motor, which frequently or continuously operates, is employed, the motor may be controlled so as to be operated while driving of the motor is stopped. The effect of the error in the balance between charge and discharge in the system on the electric power storage device is the long-term effect in which over discharge or overcharge occurs in the electric power storage device. Therefore, even when the error is not dealt with instantaneously, no problems occur.

In this case, the control portion may change the amount of electric power consumed by the load portion so as to reduce the difference. With this structure, driving of the load portion is controlled in a feedback manner such that the deviation between the supply electric power set value and the actual supply electric power value is removed.

Also, the hybrid fuel cell system may further include a filter which removes a noise component contained in the difference and which outputs the difference with the noise component removed to the control portion.

In this case, the control portion may change the amount of electric power consumed by the load portion so as to reduce the difference with the noise component removed.

A hybrid fuel cell system according to another aspect of the invention includes a fuel cell and an electric power storage device. The hybrid fuel cell system further includes a load portion which consumes electric power; first control means for obtaining a supply electric power set value indicating an amount of electric power which needs to be supplied from the electric power storage device, based on a supply electric power set value indicating an amount of electric power which needs to be supplied from the fuel cell and a consumption electric power set value indicating an amount of electric power which needs to be consumed by the load portion; difference obtaining means for obtaining a difference between the supply electric power set value indicating the amount of electric power which needs to be supplied from the electric power storage device and an actual supply electric power value indicating an amount of electric power which is actually supplied from the electric power storage device; and second control means for controlling the amount of electric power consumed by the load portion based on the difference.

The first control means may obtain the supply electric power set value indicating the amount of electric power which needs to be supplied from the electric power storage device, based on at least the supply electric power set value indicating the amount of electric power which needs to be supplied from the fuel cell and the consumption electric power set value indicating the amount of electric power which needs to be consumed by the load portion.

The load portion may include a system accessory. Also, the first control means may obtain the supply electric power set value indicating the amount of electric power which needs to be supplied from the electric power storage device, using the consumption electric power set value including an amount of electric power consumed by the system accessory.

Also, the load portion may include a drive motor, and the second control means may control an amount of electric power consumed by the drive motor based on the difference.

The hybrid fuel cell system may further include computing means for changing the amount of electric power consumed by the load portion so as to reduce the difference.

The hybrid fuel cell system may include a filter which removes a noise component contained in the difference, and which outputs the difference with the noise component removed to the control portion.

In this case, the hybrid fuel cell system may further include computing means for changing the amount of electric power consumed by the load portion so as to reduce the difference with the noise component removed.

BRIEF DESCRIPTION OF THE DRAWINGS

The above-mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE PREFERRED EMBODIMENTS

Figure 1:
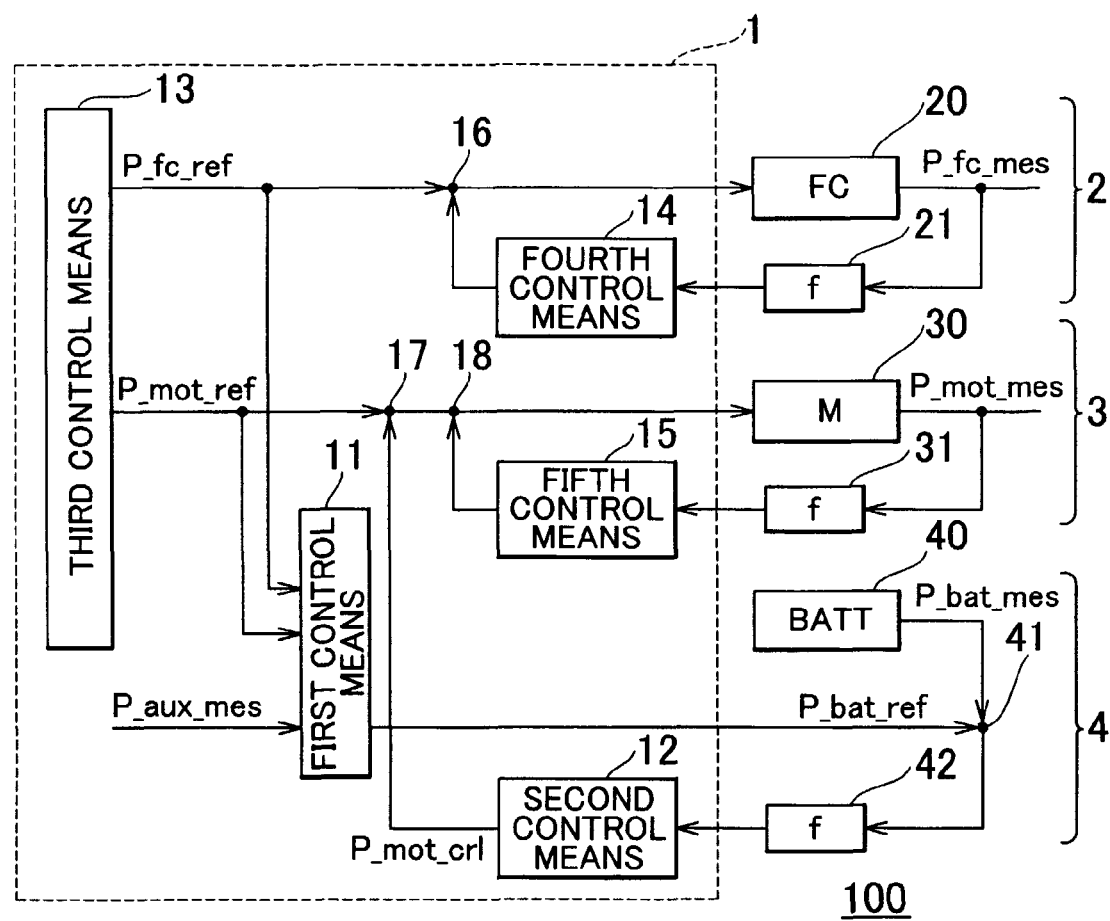
FIG. 1 is a block diagram describing an embodiment of the invention.

In the following description, the present invention will be described in more detail in terms of exemplary embodiments.

Hereafter, a preferred embodiment of the invention will be described in detail with reference to an accompanying drawing.

In the embodiment, the invention is applied to a hybrid fuel cell system which is to be mounted in a movable body such as an electric automobile. FIG. 1 shows a system block diagram of the fuel cell system. Note that the invention is not limited to following embodiment, and the invention may be realized in various other embodiments within the scope of the invention.

As shown in FIG. 1, a hybrid fuel cell system 100 according to the invention is provided with a control portion 1; a fuel cell control system 2 mainly including a fuel cell stack 20; a load control system 3 mainly including a drive motor 30; and an electric power storage device control system 4 mainly including a battery 40.

The control portion 1 is a known computer system, and is housed in ROM (not shown) or the like. When a CPU (central processing unit) (not shown) sequentially performs software programs for realizing the invention, it is possible to make the system serve as the hybrid fuel cell system according to the invention. As functional blocks for making the system serve as the hybrid fuel cell system, first control means 11, second control means 12, third control means 13, fourth control means 14, fifth control means 15, computing means 16, computing means 17, computing means 18 and the like are provided.

The third control means 13 calculates a supply electric power set value $P\_fc\_ref$ related to the fuel cell control system 2 and a consumption electric power set value $P\_mot\_ref$ related to the load control system 3, which are bases of the computation. More particularly, the third control means 13 calculates required torque of the drive motor 30 by referring to positional information concerning an accelerator pedal (not shown), positional information concerning a shift lever (not shown), positional information concerning a brake (not shown), and the like of a vehicle in which the hybrid fuel cell system according to the invention is mounted. In addition, The third control means 13 calculates an amount of electric power for generating the torque, as the consumption electric power set value $P\_moto\_ref$ which is to be set in the load control system 3. The third control means 13 also calculates an amount of electric power which needs to be generated by the fuel cell stack 20 by adding power losses in an inverter (not shown) and a converter (not shown), a consumption electric power estimation value indicating the amount of electric power which is to be consumed by the system accessory, and the like to the consumption electric power set value $P\_mot\_ref$ of the drive motor 30. The third control means 13 then obtains the amount of electric power as the supply electric power set value $P\_fc\_ref$. As long as the amount of entire load of the system, which is to be consumed by the drive motor 30 and the like, does not exceed the amount of electric power which can be generated by the fuel cell stack 20, the amount of generated electric power corresponding to the supply electric power set value $P\_fc\_ref$ is equal to the amount of load of the entire system. Namely, control is performed such that the balance between charge and discharge in the system is maintained mathematically.

More particularly, the consumption electric power set value $P\_mot\_ref$ is output as an output electric power instruction signal which is output to the inverter. When an operating point, at which the entire load amount of the system can be covered concerning the V-I characteristics of the fuel cell 20, is decided, the supply electric power set value $P\_fc\_ref$ is supplied as a circulation amount and a pressure of hydrogen gas, that is fuel gas capable of supplying a voltage and a current, and a flow quantity and a pressure of air, that is an oxygen source, which correspond to the operating point. The supply electric power set value $P\_fc\_ref$ is supplied also as a control amount of the system accessory.

The fuel cell control system 2 includes a smoothing filter 21; the fourth control means 14 that is the functional block in the control portion 1; and the computing means 16, in addition to the fuel cell stack 20.

The fuel cell stack 20 corresponds to the fuel cell according to the invention. The fuel cell stack 20 is formed by stacking multiple cells each of which includes a separator having passages through which hydrogen gas, air and coolant flow, and a MEA (Membrane Electrode Assembly) interposed between the paired separators. The MEA has a structure in which a polymer electrolyte membrane is sandwiched between two electrodes, that are, a fuel electrode and an air electrode. In order to generate electric power using the fuel cell stack 20, a supply system for supplying hydrogen gas and another supply system for supplying air are provided in the fuel cell stack 20. The fuel cell stack 20 generates electric power according to the supply electric power set value $P\_fc\_ref$ supplied from the control portion 1. More particularly, the supply electric power set value $P\_fc\_ref$ is adjusted when the control portion 1 controls the circulation amount and the pressure of hydrogen gas that is fuel gas, and the circulation amount and the pressure of air that is an oxygen source. The amount of electric power actually output from the fuel cell stack 20 is measured by an electric power sensor, a voltage sensor and a current sensor (not shown), and is output as the actual supply electric power value $P\_fc\_mes$.

The smoothing filter 21 removes a noise component (high frequency component) contained in the actual supply electric power value $P\_fc\_mes$ from the fuel cell stack 20, and outputs the actual supply electric power value $P\_fc\_mes$ with the noise component removed to the control portion 1. The actual supply electric power value $P\_fc\_mes$ is actually converted from analog to digital and is input in the control portion 1 as a digital value.

The fourth control means 14 corrects an amount of electric power generated by the fuel cell stack 20 according to various conditions of the system by referring to the actual supply electric power value $P\_fc\_mes$ at the present moment, and outputs the correction amount. The computing means 16 can compute the electric power correction value for correcting the supply electric power set value $P\_fc\_ref$ based on the electric power correction amount for the fuel cell stack 20.

The load control system 3 includes the drive motor 30, a smoothing filter 31, the fifth control means 15 that is the functional block in the control portion 1, and the computing means 18.

The drive motor 30 corresponds to the main load portion according to the invention. The drive motor 30 is, for example, a three phase synchronous motor. The drive motor 30 generates torque corresponding to the amount of electric power which is obtained by correcting the consumption electric power set value $P\_mot\_ref$ output from the third control means 13 using the consumption electric power control value $P\_mot\_crl$ computed by the second control means 12 and the electric power correction value computed by the fifth control means 15.

The smoothing filter 31 removes the noise component (high frequency component) contained in a consumption electric power actual measurement value $P\_mot\_mes$, which is a measurement value of the electric power consumed by the drive motor 30, and outputs the consumption electric power actual measurement value $P\_mot\_mes$ with the noise component removed to the control portion 1. The consumption electric power actual measurement value $P\_mot\_mes$ is actually converted from analog to digital and input in the control portion 1 as a digital value.

The fifth control means 15 corrects an amount of electric power to be supplied to the drive motor 30 according to various conditions of the system by referring to the consumption electric power actual measurement value $P\_mot\_mes$ at the present moment, and outputs the correction amount. The computing means 18 can compute the electric power correction value for correcting the consumption electric power set value P_mot_ref based on the electric power correction amount of the drive motor 30.

Here, the concrete balance between charge and discharge in the fuel cell system can be shown by the following equation (1).

$$P\_bat = P\_mot + P\_aux - P\_fc \qquad (1)$$

Here, P_fc signifies the amount of electric power supplied from the fuel cell stack 20, P_mot signifies the amount of electric power consumed by the drive motor 30, P_aux signifies the amount of electric power consumed by the system accessory, and P_bat signifies the amount of electric power supplied from the battery 40.

In this case, when there is no difference between the estimated and set electric power consumption and electric power supply, and the actually obtained electric power consumption and electric power supply, the balance between charge and discharge in the system needs to be maintained according to the above equation (1). However, in actuality, due to accuracy of the sensor and error in the system, a deviation occurs between the estimated and set values and the actually obtained values. If the deviation is not corrected, an imbalance between the supply and consumption is created in the system, and in the long run, over discharge or overcharge of the battery is caused. Therefore, in the embodiment, the error is corrected in the electric power storage device control system 4.

The electric power storage device control system 4 according to the invention includes the battery 40, the first control means 11, difference obtaining means 41, a smoothing filter 42, the second control means 12, and the computing means 17.

The battery 40 is the electric power storage device according to the invention, such as a lead storage battery which has a certain current capacity. The battery 40 is connected so as to compensate the electric power which cannot be covered by the fuel cell stack 20, concerning the load amount. An electric power sensor, or a voltage sensor and a current sensor are provided in an output terminal of the battery 40. The electric power actually output from the battery 40 is measured as the actual supply electric power value P_bat_mes by these sensors. In the fuel cell system 100, an appropriate balance between charge and discharge is maintained in the system by the process according to the invention. Therefore, over discharge or overcharge of the battery 40 can be prevented.

The first control means 11 computes the electric power storage device set value P_bat_ref in the invention. More particularly, the first control means 11 subtracts the amount of electric power which can be supplied from the fuel cell stack 20 from the entire load amount of the system including the amount of electric power consumed by the drive motor 30 and the system accessory and the losses. The first control means 11 then calculates the value obtained by the subtraction as the amount of electric power which needs to be compensated by the battery 40. More particularly, the first control means 11 uses the consumption electric power set value P_mot_ref of the drive motor 30 computed by the third control means 13 as the main load amount. The first control means 11 may add the consumption electric power actual measurement value P_aux_mes supplied from the electric power detecting sensor of the system accessory, that is the sub load amount, to the consumption electric power set value P_mot_ref. The first control means 11 then subtracts the supply electric power set value P_fc_ref, which indicates the amount of electric power that can be supplied from the fuel cell stack 20, from the result of the above addition. Further, the first control means 11 calculates the result of this computation as the supply electric power set value P_bat_ref corresponding to the amount of electric power which needs to be supplied from the battery 40.

In this case, the actual measurement value is used as the amount of electric power consumed by the system accessory. The amount of electric power consumed by the system accessory is smaller than the amount of electric power consumed by the drive motor 30, and does not cause a large deviation even if a small error is contained. In the case where the amount of electric power consumed by the system accessory is large or the fluctuation in the electric power consumption is small, the estimated consumption electric power estimation value may be used as the load amount of the system accessory.

The difference obtaining means 41 performs computation so as to obtain the difference between the actual supply electric power value P_bat_mes which is the measurement value of the output electric power in the battery 40 and the supply electric power set value P_bat_ref in the first control means 11, and outputs the difference. The smoothing filter 42 removes a noise component (high frequency component) contained in the difference value of the difference obtaining means 41, and outputs the difference value with the noise component removed to the control portion 1. The output difference is actually converted from analog to digital and is input in the control portion 1 a digital value.

The second control means 12 according to the invention inputs the difference between the actual supply electric power value P_bat_mes of the battery 40 and the supply electric power set value P_bat_ref of the first control means 11, calculates the load amount for correcting an imbalance between charge and discharge in the system when the imbalance has occurred, and outputs the electric power correction value for making the drive motor 30 increase or decrease the load amount, as the consumption electric power control value P_mot_crl.

The computing means 17 adds/subtracts the consumption electric power control value P_mot_crl to/from the consumption electric power set value P_mot_ref of the drive motor 30. When there is a difference between the actual supply electric power value P_bat_mes of the battery 40 and the supply electric power set value P_bat_ref of the first control means 11, the computing means 17 then changes the amount of electric power consumed by the drive motor 30 so as to decrease the difference to "0".

In the above-mentioned structure, each of the smoothing filters 21, 31 and 42 is provided as hardware. However, a filter process may be performed according to a software program. The difference obtaining means 41 is shown in the figure as hardware computing means. However, the difference may be calculated by the computing process based on a software program.

According to the above-mentioned embodiment, the first control means 11 computes the supply electric power set value P_bat_ref indicating the amount of electric power which needs to be supplied from the battery 40 based on the supply electric power set value P_fc_ref indicating the amount of electric power which needs to be supplied from the fuel cell stack 20, the consumption electric power set value P_mot_ref corresponding to the load amount of the drive motor 30, and the consumption electric power actual measurement value P_aux_mes corresponding to the load amount of the system accessory. Then, the difference obtaining means 41 obtains the difference between the supply electric power set value P_bat_ref and the actual supply electric power value P_bat_mes which is actually output from the battery 40. Then, the second control means 12 outputs the consumption electric power control value P_mot_crl for correcting the imbalance between charge and discharge in the system, which corresponds to the difference.

Therefore, with the above-mentioned structure, an operation is performed such that the imbalance between charge and discharge in the system is removed by the drive motor which is the load portion. Accordingly, a voltage drop due to over discharge of the battery and the voltage increase due to overcharge of the battery can be prevented effectively.

At this time, as the value used for computing the balance between charge and discharge in the system, it is preferable to avoid using the actual measurement value which may cause an error in the system, such as accuracy of the sensor. Thus, inaccuracy of the sensor and the error in the system can be removed at a considerably high level. Therefore, the computation of the balance between charge and discharge in the system is accurate, and an imbalance between charge and discharge is not caused in the system in the long run. Accordingly, over discharge and overcharge of the battery can be reliably prevented, and reduction of the system efficiency can be prevented.

Note that the invention is not limited to the above-mentioned embodiment, and the invention may be realized in various other embodiments within the scope of the invention. Namely, in the embodiment, the invention is applied to the in-vehicle fuel cell system. However, the invention can be applied to a system in which the fuel cell electric power generation and an electric power storage device are employed in combination. For example, the invention can applied to transport systems other than a vehicle and power generation plants.

The invention claimed is:

1. A hybrid fuel cell system, comprising:
a fuel cell;
an electric power storage device;
a load portion which consumes electric power; and
a control portion that is programmed to:
compute a supply electric power set value, which is an amount of electric power that needs to be supplied from the electric power storage device;
measure an actual supply electric power value indicating an amount of electric power that is actually supplied from the electric power storage device;
determine whether the supply electric power set value is greater than or less than the actual supply electric power value; and
change an amount of electric power consumed by the load portion to increase or decrease consumption after the control portion determines that the supply electric power set value is greater than or less than the actual supply electric power value;
wherein the control portion is programmed to change the amount of electric power consumed by the load portion to increase or decrease consumption to remove imbalance between charge and discharge of the electric power storage device in the system by reducing a difference between the supply electric power set value and the actual supply electric power value.

2. The hybrid fuel cell system according to claim 1, wherein the control portion is programmed to obtain the supply electric power set value based on at least a second supply electric power set value indicating an amount of electric power that needs to be supplied from the fuel cell and a consumption electric power set value indicating an amount of electric power that needs to be consumed by the load portion.

3. The hybrid fuel cell system according to claim 2, wherein the load portion includes a system accessory, and the control portion is programmed to obtain the supply electric power set value, using the consumption electric power set value including an amount of electric power consumed by the system accessory.

4. The hybrid fuel cell system according to claim 1, wherein the load portion includes a drive motor, and the control portion is programmed to control an amount of electric power consumed by the drive motor based on the difference between the supply electric power set value and the actual supply electric power value.

5. A hybrid fuel cell system, comprising:
a fuel cell;
an electric power storage device;
a load portion which consumes electric power;
a control portion that is programmed to:
compute a supply electric power set value, which is an amount of electric power that needs to be supplied from the electric power storage device;
measure an actual supply electric power value indicating an amount of electric power that is actually supplied from the electric power storage device;
determine whether the supply electric power set value is greater than or less than the actual supply electric power value; and
change an amount of electric power consumed by the load portion to increase or decrease consumption after the control portion determines that the supply electric power set value is greater than or less than the actual supply electric power value; and
a filter that removes a noise component contained in a difference between the supply electric power set value and the actual supply electric power value and that outputs the difference with the noise component removed to the control portion,
wherein the control portion is programmed to change the amount of electric power consumed by the load portion to increase or decrease consumption to remove imbalance between charge and discharge of the electric power storage device in the system by reducing the difference with the noise component removed.

6. The hybrid fuel cell system according to claim 5, wherein the control portion is programmed to obtain the supply electric power set value based on at least a second supply electric power set value indicating an amount of electric power that needs to be supplied from the fuel cell and a consumption electric power set value indicating an amount of electric power that needs to be consumed by the load portion.

7. The hybrid fuel cell system according to claim 6, wherein the load portion includes a system accessory, and the control portion is programmed to obtain the supply electric power set value, using the consumption electric power set value including an amount of electric power consumed by the system accessory.

8. The hybrid fuel cell system according to claim 5, wherein the load portion includes a drive motor, and the control portion is programmed to control an amount of electric power consumed by the drive motor based on the difference between the supply electric power set value and the actual supply electric power value.

9. A hybrid fuel cell system, comprising:
a fuel cell;
an electric power storage device;
a load portion which consumes electric power;
a first control portion that is programmed to:
compute a supply electric power set value, which is an amount of electric power that needs to be supplied from the electric power storage device, based on a second supply electric power set value indicating an amount of electric power that needs to be supplied from the fuel cell and a consumption electric power set value indicating an amount of electric power that needs to be consumed by the load portion; and measure an actual supply electric power value indicating an amount of electric power that is actually supplied from the electric power storage device;

a difference obtaining portion that is programmed to determine whether the supply electric power set value is greater than or less than the actual supply electric power value;

a second control portion that is programmed to control the amount of electric power consumed by the load portion based on a difference between the supply electric power set value and the actual supply electric power value; and a computing portion that is programmed to change the amount of electric power consumed by the load portion to increase or decrease consumption after the difference obtaining portion determines that the supply electric power set value is greater than or less than the actual supply electric power value to remove imbalance between charge and discharge of the electric power storage device in the system by reducing the difference between the supply electric power set value and the actual supply electric power value.

10. The hybrid fuel cell system according to claim 9, wherein the load portion includes a system accessory, and the first control portion is programmed to obtain the supply electric power set value, using the consumption electric power set value including an amount of electric power consumed by the system accessory.

11. The hybrid fuel cell system according to claim 9, wherein the load portion includes a drive motor, and the second control portion is programmed to control an amount of electric power consumed by the drive motor based on the difference between the supply electric power set value and the actual supply electric power value.

12. A hybrid fuel cell system, comprising:
a fuel cell;
an electric power storage device;
a load portion which consumes electric power, the load portion including a system accessory device other than a main drive motor;
a control portion that is programmed to;
    compute a supply electric power set value, which is an amount of electric power that needs to be supplied from the electric power storage device;
    measure an actual supply electric power value indicating an amount of electric power that is actually supplied from the electric power storage device;
    determine whether the supply electric power set value is greater than or less than the actual supply electric power value; and
    change an amount of electric power consumed by the load portion to increase or decrease consumption after the control portion determines that the supply electric power set value is greater than or less than the actual supply electric power value; and
a filter that removes a noise component contained in a difference between the supply electric power set value and the actual supply electric power value, and that outputs the difference with the noise component removed to the control portion; and
a computing portion that is programmed to change an amount of electric power consumed by the system accessory device of the load portion to remove imbalance between charge and discharge of the electric power storage device in the system by reducing the difference with the noise component removed.

13. The hybrid fuel cell system according to claim 12, wherein the control portion is programmed to obtain the supply electric power set value based on at least a second supply electric power set value indicating an amount of electric power that needs to be supplied from the fuel cell and a consumption electric power set value indicating an amount of electric power that needs to be consumed by the load portion.

14. The hybrid fuel cell system according to claim 13, wherein the load portion includes a system accessory, and the control portion is programmed to obtain the supply electric power set value, using the consumption electric power set value including an amount of electric power consumed by the system accessory.

15. The hybrid fuel cell system according to claim 12, wherein the load portion includes a drive motor, and the control portion is programmed to control an amount of electric power consumed by the drive motor based on the difference between the supply electric power set value and the actual supply electric power value.

16. A hybrid fuel cell system, comprising:
a fuel cell;
an electric power storage device;
a load portion which consumes electric power, the load portion including a system accessory device other than a main drive motor;
first control means for:
    obtaining a supply electric power set value, which is an amount of electric power that needs to be supplied from the electric power storage device, based on a second supply electric power set value indicating an amount of electric power that needs to be supplied from the fuel cell and a consumption electric power set value indicating an amount of electric power that needs to be consumed by the load portion; and
    measuring an actual supply electric power value indicating an amount of electric power that is actually supplied from the electric power storage device;
difference obtaining means for determining whether the supply electric power set value is greater than or less than the actual supply electric power value;
second control means for controlling the amount of electric power consumed by the load portion based on a difference between the supply electric power set value and the actual supply electric power value; and
computing means for changing an amount of electric power consumed by the system accessory device of the load portion after the difference obtaining means determines that the supply electric power set value is greater than or less than the actual supply electric power value to remove imbalance between charge and discharge of the electric power storage device in the system by reducing the difference between the supply electric power set value and the actual supply electric power value.

17. A hybrid fuel cell system, comprising:
a fuel cell;
an electric power storage device;
a load portion which consumes electric power, the load portion including a system accessory device other than a main drive motor;
a control portion that is programmed to:
    compute a supply electric power set value, which is an amount of electric power that needs to be supplied from the electric power storage device;

measure an actual supply electric power value indicating an amount of electric power that is actually supplied from the electric power storage device;

determine whether the supply electric power set value is greater than or less than the actual supply electric power value; and change an amount of electric power consumed by the load portion to increase or decrease consumption after the control portion determines that the supply electric power set value is greater than or less than the actual supply electric power value; and a filter that removes a noise component contained in a difference between the supply electric power set value and the actual supply electric power value, and that outputs the difference with the noise component removed to the control portion; and computing means for changing an amount of electric power consumed by the system accessory device of the load portion to remove imbalance between charge and discharge of the electric power storage device in the system by reducing the difference with the noise component removed.

* * * * *